(12) United States Patent
Silberberg

(10) Patent No.: US 7,536,798 B2
(45) Date of Patent: May 26, 2009

(54) MULTIPLE ANGLE COMPACT SPIRIT LEVEL

(75) Inventor: Mark L. Silberberg, Ranchos Palos Verdes, CA (US)

(73) Assignee: Precision Designed Products, Inc., Harbor City, CA (US)

( * ) Notice: Subject to any disclaimer, the term of this patent is extended or adjusted under 35 U.S.C. 154(b) by 4 days.

(21) Appl. No.: 11/755,150

(22) Filed: May 30, 2007

(65) Prior Publication Data

US 2008/0222907 A1 Sep. 18, 2008

(51) Int. Cl.
*G01C 9/24* (2006.01)

(52) U.S. Cl. .......................................... 33/379; 33/451

(58) Field of Classification Search ............ 33/365, 33/379, 381–385, 347, 343, 370–373, 451, 33/481, 529, 412, 492
See application file for complete search history.

(56) References Cited

U.S. PATENT DOCUMENTS

| | | | | |
|---|---|---|---|---|
| 2,568,143 A | | 9/1951 | Casper | |
| 4,085,515 A | * | 4/1978 | Darden | 33/377 |
| 4,653,193 A | | 3/1987 | Kennedy et al. | |
| 4,908,949 A | * | 3/1990 | Jaccard | 33/334 |
| 4,977,680 A | * | 12/1990 | Marshall | 33/508 |
| 5,174,034 A | * | 12/1992 | Swanda | 33/365 |
| 5,402,579 A | * | 4/1995 | Smith | 33/354 |
| 5,492,322 A | * | 2/1996 | Smith | 33/379 |
| 5,509,210 A | * | 4/1996 | Murphy | 33/382 |
| 5,755,623 A | * | 5/1998 | Mizenko | 33/384 |
| 5,806,197 A | * | 9/1998 | Angelucci | 33/451 |
| 6,029,360 A | | 2/2000 | Koch | |
| 6,098,300 A | * | 8/2000 | Angelucci | 33/451 |
| 6,386,994 B1 | * | 5/2002 | H'Doubler et al. | 33/379 |
| 6,434,848 B1 | * | 8/2002 | Gordon et al. | 33/528 |
| 6,779,276 B1 | * | 8/2004 | Turner | 33/379 |
| 6,839,973 B1 | * | 1/2005 | Woodward | 33/371 |
| 6,918,187 B2 | * | 7/2005 | Schaefer | 33/365 |
| 6,981,330 B2 | * | 1/2006 | Tieszen | 33/370 |
| 6,996,911 B1 | * | 2/2006 | Dinius | 33/481 |
| 7,117,606 B2 | | 10/2006 | Brown | |
| 2002/0174553 A1 | * | 11/2002 | Dolezal et al. | 33/373 |

* cited by examiner

*Primary Examiner*—Yaritza Guadalupe-McCall
(74) *Attorney, Agent, or Firm*—Altman & Martin; Steven K Martin

(57) ABSTRACT

The level with a generally u-shaped or round, rigid frame. The outer surface is comprised of a number of planar reference faces that are at different fixed angles to a spirit vial mounted in the frame. Optionally, magnets are embedded in the reference faces. Optionally, there are grooves in the reference faces.

7 Claims, 5 Drawing Sheets

MULTIPLE ANGLE COMPACT SPIRIT LEVEL

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to measuring devices, more particularly, to spirit levels for determining if a work piece is at the desired angle.

2. Description of the Related Art

Spirit levels are old and well-known and enjoy wide usage. In general, a spirit level comprises an elongated frame with at least one flat reference surface and at least one spirit vial mounted in the frame. The vial contains a liquid with an entrapped bubble. The reference surface is placed against a workpiece and, when the bubble is centered between a pair of markings on the vial, that is, the vial is horizontal, that workpiece is known to be at a predetermined angle. Many spirit levels are provided with two or more vials at different fixed angles so that they can be used to check more than one surface angle. Naturally, as more vials are added, the level becomes more elongated and less portable.

One solution to the increased size of the multiple-angle spirit level, disclosed in U.S. Pat. No. 2,568,143, is the use of a single vial that has multiple surfaces for centering the bubble at different angles to a single reference surface. Another solution, disclosed in U.S. Pat. No. 5,127,16, uses a single vial with changeable end caps. The relative size of the two end caps determine the angle to be checked. Another solution, disclosed in numerous patents, is the adjustable level where the vial is mounted so that it can be rotated relative to the reference surface. The rotatable vial has an angular scale so that the angle of the vial to the reference surface can be set as desired.

BRIEF SUMMARY OF THE INVENTION

An object of the present invention is to provide a level that can indicate multiple angles with a single spirit vial.

Another object is to provide a compact level that can indicate multiple angles.

The level of the present invention has a generally u-shaped or round, rigid frame with the outer surface comprised of a number of reference faces that are at different angles to a spirit vial. The spirit vial is of a type that is well-known in the art. The vial is securely mounted to an inner portion of the frame.

A reference face has a planar surface that is at a known angle to the vial axis. The reference faces are generally contiguous and are typically at standard angles to the vial, including 0°, 22.5°, 30°, 45°, 60°, and 90°, although they can be at any known angles desired.

The outer surface may have features other than reference faces, such as a carrying hook or handle, or a flange for a carrying cord.

Optionally, magnet are embedded in the reference faces to provides a means to attach the level to ferrous surfaces without having to manually hold it in place.

Optionally, there are grooves in the reference faces that extend parallel to the side walls to help hold the level stable against a cylindrical surface.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
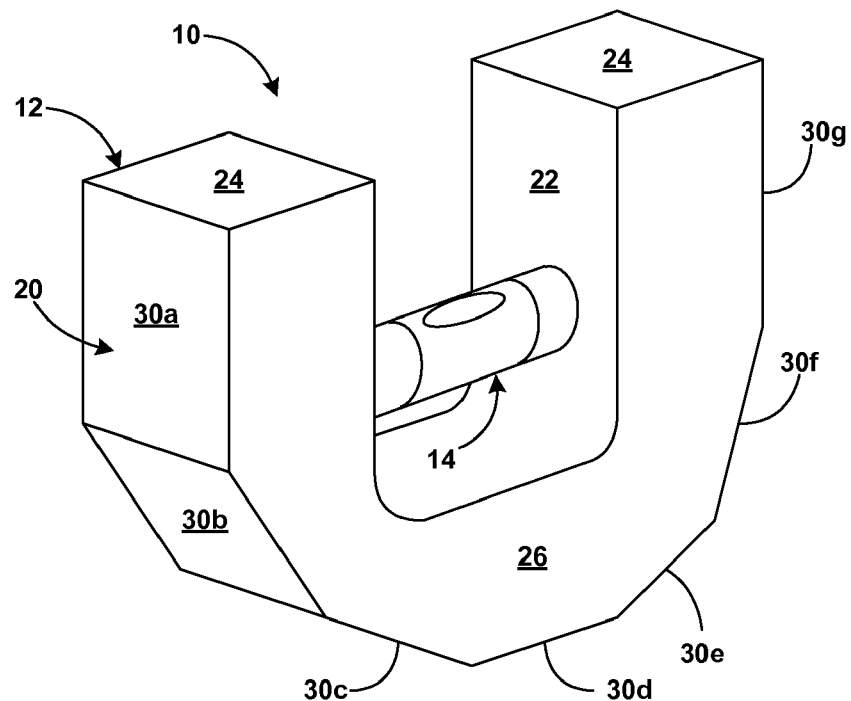
FIG. 1 is a perspective drawing of one embodiment of the level of the present invention.
Figure 2:
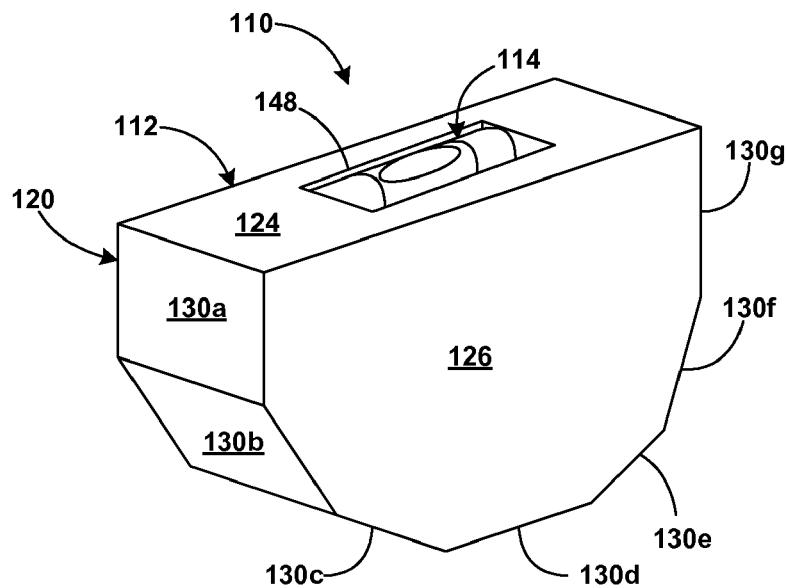
FIG. 2 is a perspective view of a second embodiment of the level of the present invention.
Figure 3:
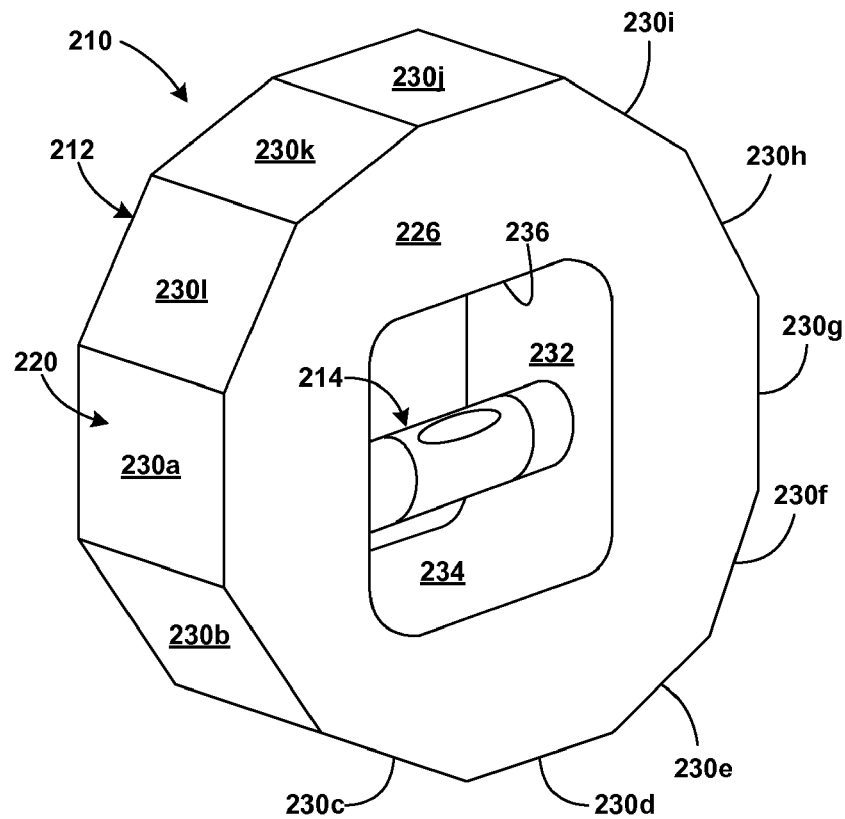
FIG. 3 is a perspective view of a third embodiment of the level of the present invention.

The level 10, 110, 210 of the present invention, shown in several embodiments in FIGS. 1-3, are comprised of a frame 12, 112, 212 and a spirit vial 14, 114, 214. In short, the level 10, 110 has a number of references faces 30a-30f, 130a-130f, 230a-230l (collectively, 30, 130, 230) that are at different angles to the vial 14, 114, 214 so that the level 10, 110, 210 can be used to measure different angles while remaining compact.

Figure 4:
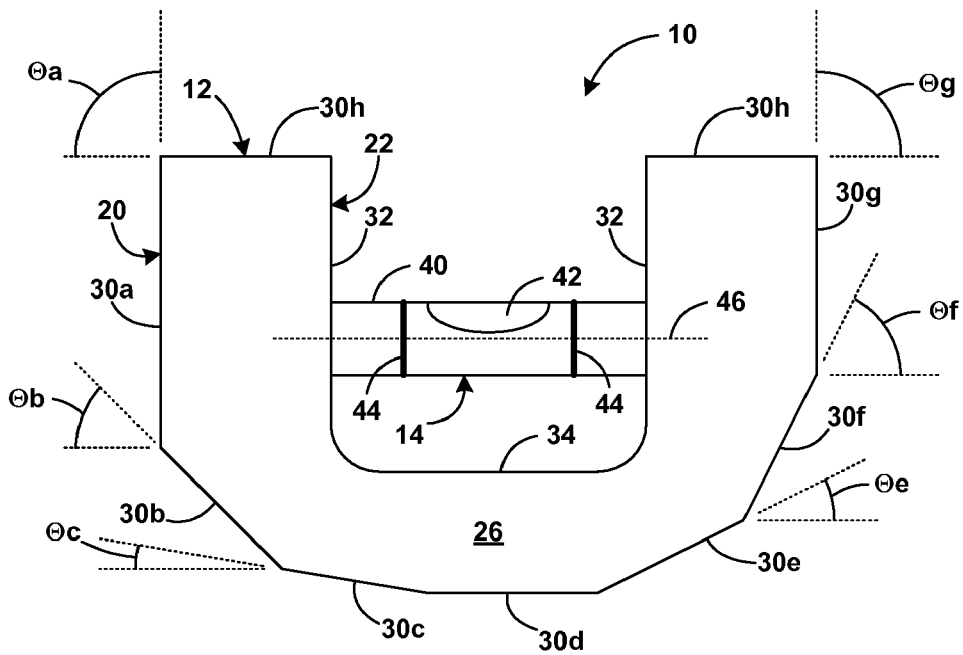
FIG. 4 is a front view of the level of FIG. 1.
Figure 5:
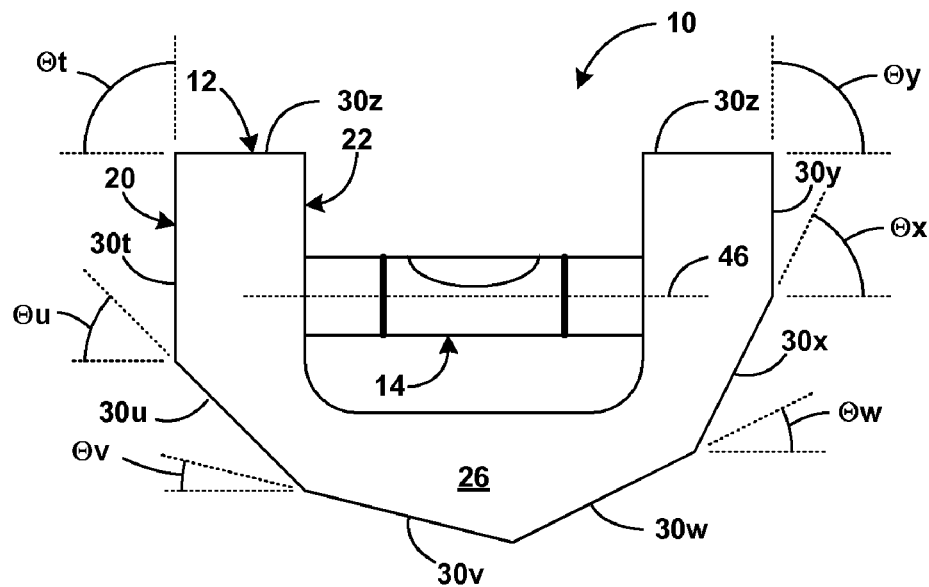
FIG. 5 is a front view of a different configuration of the level of FIG. 1.

In one embodiment of the level 10 of the present invention, the frame 12 is generally U-shaped, as shown in FIGS. 1, 4, and 5. It has an outer surface 20, an inner surface 22, a pair of top surfaces 24, and a pair of opposed side walls 26. The outer surface 20 is composed of a contiguous set of reference faces 30, described below. The inner surface 22 generally concentric with the outer surface 20, and has a pair of opposed walls 32 and a floor 34. The top reference surfaces 30h are coplanar and the side walls 26 are generally parallel. The thickness of the frame 12, that is, the dimension separating the side walls 26, is large enough so that the level 10 rests stably on the outside surface 20. The thickness is dependent upon the overall size of the level 10, that is, the larger the level 10 is, the thicker the frame 12 needs to be in order to be stable.

In another embodiment of the level 110 of the present invention, shown in FIG. 2, the frame 112 is generally U-shaped, like the embodiment of FIG. 1, but without the inner surface 22 of the embodiment of FIG. 1. It has an outer surface 120, a top surface 124, and a pair of opposed side walls 126. The outer surface 120 is composed of a contiguous set of reference faces 130, described below. The side walls 126 are generally parallel. As with the first embodiment, the thickness of the frame 112 is large enough so that the level 110 rests stably on the outside surface 120.

In another embodiment of the level 210 of the present invention, shown in FIG. 3, the frame 212 is generally circular. It has an outer surface 220, an inner surface 222, and a pair of opposed side walls 226. The outer surface 220 is composed of a contiguous set of reference faces 230, described below. The inner surface 222 has a pair of opposed walls 232, a floor 234, a ceiling 236. The side walls 226 are generally parallel. Like the embodiments of FIGS. 1 and 2, the thickness of the frame 212 is large enough so that the level 210 rests stably on the outside surface 220.

The U-shaped and circular embodiments described above are but two examples of the arc through which the frame 12 can extend. The present invention contemplates that the arc can extend through any arc, as long as it is able to hold a vial 14 and have multiple reference faces. For example, a frame with an arc of 90° can hold a vial and have references faces of 0°, 90°, and an angle between 0° and 90°.

In the present specification, except where specifically indicated, all references to elements of the U-shaped embodiment 10 of FIG. 1 are intended to be references to the other embodiments as well.

The frame 12 is composed of a rigid, stable material. Examples of contemplated materials include plastics, fiberglass, carbon composites, and metals, such as aluminum alloys, steel, and titanium alloys.

The spirit vial 14, 114, 214 is of a type that is well-known in the art. As shown in FIG. 4, a sealed, transparent, slightly convex tube 40 contains a liquid with a bubble 42. A pair of annular rings 44 that are slightly more than the length of the bubble 42 apart delimit the center of the vial 14. When the vial axis 46 is horizontal, the bubble 42 is centered between the rings 44.

In the embodiments of FIGS. 1 and 3 and as shown in FIG. 4, the vial 14 is securely mounted between the two opposed inner walls 32 of the frame 12. Typically, a pair of coaxial holes are formed in the frame 12, the vial 14 is positioned centrally in the holes, and an adhesive secures the vial 14 in the holes. The present invention contemplates that any method that can adequately secure the vial 14 in the appropriate position can be used.

In the embodiment of FIG. 2, the vial 114 is securely mounted parallel to the top surface 124 in a depression 148 in the top surface 124. Typically, an adhesive secures the vial 114 in the depression 148. The present invention contemplates that any method that can adequately secure the vial 114 parallel to the top surface 124 can be used.

The present invention also contemplates that there may be more than one vial 14. There may be two or more vials 14 mounted in the frame 12 at different angles.

The outer surface 20 of the frame 12 includes a plurality of reference faces 30. A reference face 30 has a planar surface that is at a known angle to the vial axis 46. In the configuration of FIG. 4, reference face 30a is at angle Θa=90° (perpendicular) to the vial axis 46, reference face 30b is at angle Θb=45° to the vial axis 46, reference face 30c is at angle Θc=22.5° to the vial axis 46, reference face 30d is parallel (0°) to the vial axis 46, reference face 30e is at angle Θe=30° to the vial axis 46, reference face 30f is at angle Θf=60° to the vial axis 46, reference face 30g is at angle Θf=90°, and reference face 30h, which is the two coplanar surfaces at the top of the frame 12, is parallel (0°) to the vial axis 46. In the configuration of FIG. 5, reference face 30t is at angle Θa=90° (perpendicular) to the vial axis 46, reference face 30u is at angle Θu=45° to the vial axis 46, reference face 30v is at angle Θv=22.5° to the vial axis 46, reference face 30w is at angle Θw=30° to the vial axis 46, reference face 30x is at angle Θx=60° to the vial axis 46, reference face 30y is at angle Θy=90° (perpendicular) to the vial axis 46, and reference face 30z, which is the two coplanar surfaces at the top of the frame 12, is parallel (0°) to the vial axis 46.

These examples are but two sets of reference face angles. The present invention contemplates that the reference faces 30 can be at any desired angle to the vial axis 46 and that there may be any number of reference faces 30.

Figure 6:
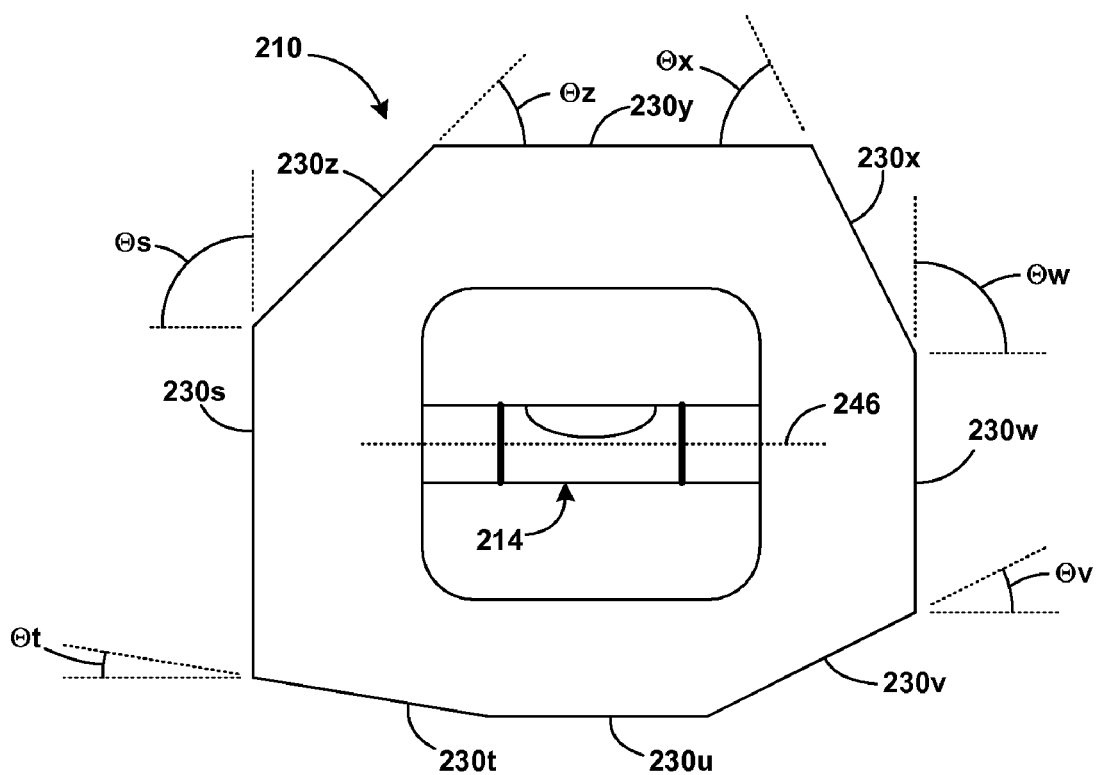
FIG. 6 is a front view of a different configuration of the level of FIG. 3.

In the embodiment of FIG. 3, where the outer surface 220 extends completely around the level, there can be more reference faces 230 or more duplicate reference faces 230. An example configuration is shown in FIG. 6, reference face 230s is at angle Θs=90° (perpendicular) to the vial axis 246, reference face 230t is at angle Θt=22.5° to the vial axis 246, reference face 230u is parallel (0°) to the vial axis 246, reference face 230v is at angle Θv=30° to the vial axis 246, reference face 230w is at angle Θw=90° (perpendicular) to the vial axis 246, reference face 230x is at angle Θx=60° to the vial axis 246, reference face 230y is parallel (0°) to the vial axis 246, and reference face 230z is at angle Θz=45° to the vial axis 246. As with the other embodiments, the present invention contemplates that the reference faces 230 can be at any desired angle to the vial axis 246 and that there may be any number of reference faces 230.

Figure 7:
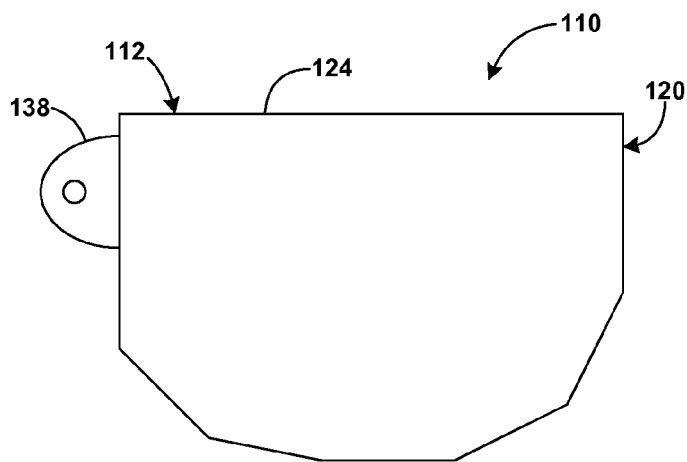
FIG. 7 is a front view of the level of FIG. 2 with an outer surface section that is not a reference face.

The present invention also contemplates that the outer surface 20 may not be composed entirely of reference faces 30, but may include other features that are not reference faces. In the example of FIG. 7, one section of the outer surface 120 has a flange 138 for carrying. Other contemplated features include carrying hooks or handles.

Figure 8:
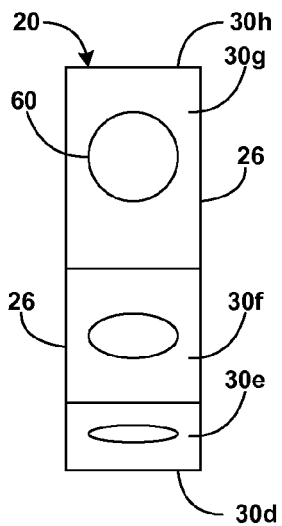
FIG. 8 is a side view of the level of FIG. 1 including optional magnets.
Figure 10:
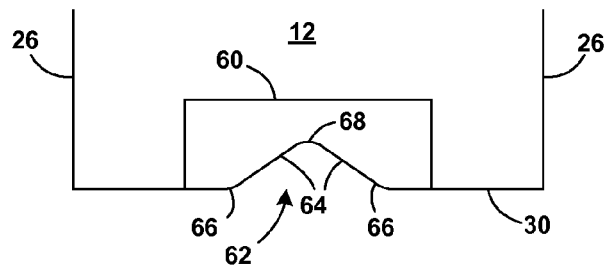
FIG. 10 is a cross-sectional view of a reference face showing the groove of FIG. 9 and an optional magnet.

Optionally, as shown in FIGS. 8 and 10, a magnet 60 is embedded in one or more of the reference faces 30. The magnet 60 provides a means to removably attach the level 10 to ferrous surfaces without having to manually hold it in place. This is particularly useful for non-horizontal surfaces.

Figure 9:
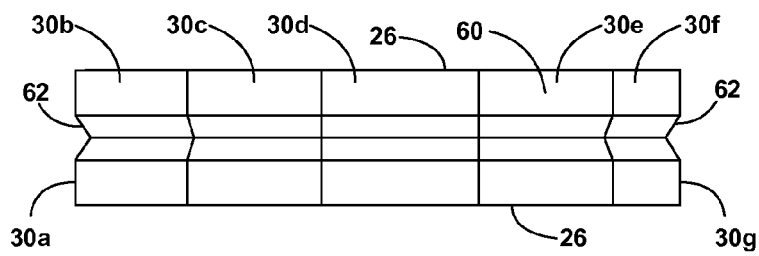
FIG. 9 is a bottom view of the level of FIG. 1 including one configuration of optional grooves.
Figure 11:
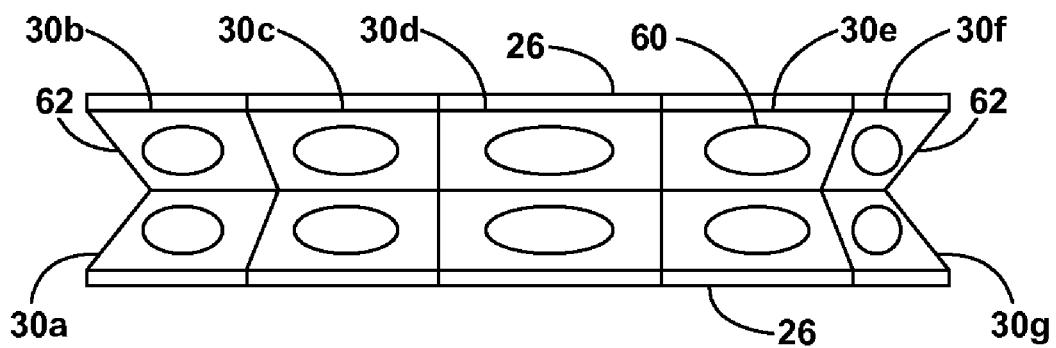
FIG. 11 is a bottom view of the level of FIG. 1 including another configuration of optional grooves.
Figure 12:
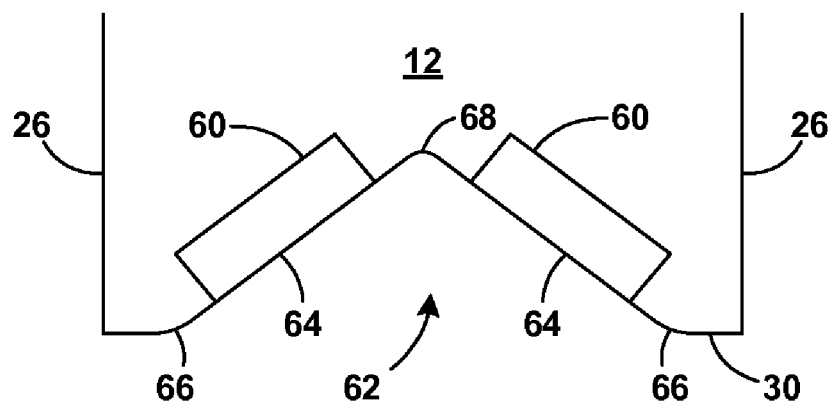
FIG. 12 is a cross-sectional view of a reference face showing the groove of FIG. 11 and optional magnets.

Optionally, as shown in FIGS. 9-11, there is a groove 62 in one or more of the reference faces 30 that extends parallel to the side walls 26. The purpose of the groove 62 is to help hold the level 10 stable against a cylindrical surface, such as a water pipe or electrical conduit. As shown in FIGS. 10 and 12, the groove 62 is generally V-shaped, with side walls 64 that slope inwardly. The side walls come together at an inside corner 68 that is parallel to the plane of the reference face 30 so that the groove 62 is at the same angle to the vial axis as the reference face 30. The corners 66, 68 are typically rounded. In the configuration of FIG. 10, the groove 62 extends through the face of an embedded magnet 60. In the configuration of FIG. 12, each face 64 of the groove 62 has an embedded magnet 60.

As indicated above, one object of the present invention is to provide a multiple angle spirit level that is compact. Compact means that the level is portable and can be carried easily. For example, in one configuration of the U-shaped embodiment of FIG. 1, the level 10 is 2.5 inches high, 2 inches wide, and 0.75 inches thick. This size permits a person to carry the level in the pouch at the belt or in a small tool box.

Thus it has been shown and described a multiple-angle spirit level which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

I claim:

1. A spirit level comprising:
   (a) a rigid, generally U-shaped frame having an outer surface and an inner surface, said inner surface being generally concentric with said outer surface and having a pair of opposed walls;
   (b) at least one spirit vial mounted to said frame between said opposed walls and having an axis; and
   (c) said outer surface comprised of at least three reference faces at predetermined fixed angles to said vial axis, said predetermined angles includes at least 0 degrees, 90 degrees, and third angle between 0 degrees and 90 degrees.

2. The spirit level of claim 1 wherein at least one of said reference faces has an imbedded magnet.

3. The spirit level of claim 1 wherein at least one of said reference faces has a groove.

4. A spirit level comprising:
   (a) a rigid, generally circular frame having an outer surface and an inner surface, said inner surface being generally concentric with said outer surface and having a pair of opposed walls;
   (b) at least one spirit vial mounted to said frame between said opposed walls and having an axis; and
   (c) said outer surface comprised of at least three reference faces at predetermined fixed angles to said vial axis.

5. The spirit level of claim 4 wherein said predetermined angles include at least 0 degrees, 90 degrees, and third angle between 0 degrees and 90 degrees.

6. The spirit level of claim 4 wherein at least one of said reference faces has an imbedded magnet.

7. The spirit level of claim 4 wherein at least one of said reference faces has a groove.

* * * * *